United States Patent [19]

Geschka et al.

[11] Patent Number: 5,055,638
[45] Date of Patent: Oct. 8, 1991

[54] PLASTIC CONTRACTING SYSTEM FOR TRANSMISSION TO VEHICLES

[75] Inventors: Martin Geschka; Michael ten Hompel, both of Dortmund, Fed. Rep. of Germany

[73] Assignee: Fraunhofer Gesellschaft zur Förderung der angewandten Forschung e.V., Munich, Fed. Rep. of Germany

[21] Appl. No.: 375,816

[22] Filed: Jul. 5, 1989

[30] Foreign Application Priority Data

Jul. 4, 1988 [DE] Fed. Rep. of Germany ....... 3822535

[51] Int. Cl.$^5$ .............................................. B60M 1/02
[52] U.S. Cl. ........................ 191/22 DM; 191/29 DM; 191/33 PM
[58] Field of Search ............... 191/23 R, 33 PM, 46, 191/49, 33 R, 45 R, 22 R, 22 DM, 29 DM; 246/122 R, 167 D

[56] References Cited

U.S. PATENT DOCUMENTS

| 3,619,604 | 11/1971 | Auer et al. ............ 246/122 R X |
| 3,836,770 | 9/1974 | Helmcke et al. ........ 246/122 R X |
| 3,855,937 | 12/1974 | Caudill ..................... 191/23 X |
| 3,902,689 | 9/1975 | Hermann et al. ........ 246/122 R X |
| 3,998,306 | 12/1976 | Howell, Jr. ............... 191/23 R |
| 4,215,770 | 8/1980 | Bormann .................. 191/23 R |
| 4,330,811 | 5/1982 | Bordner .................... 174/47 X |
| 4,813,130 | 3/1989 | Fey et al. ................. 174/267 X |
| 4,888,454 | 12/1989 | Scarpatetti et al. ....... 191/23 R X |

FOREIGN PATENT DOCUMENTS

| 1150705 | 6/1963 | Fed. Rep. of Germany ........ 191/22 DM |
| 1815096 | 6/1970 | Fed. Rep. of Germany ........ 191/33 PM |
| 2139848 | 2/1973 | Fed. Rep. of Germany .... 191/33 R |
| 2317240 | 10/1974 | Fed. Rep. of Germany ........ 191/22 DM |
| 52-27110 | 1/1977 | Japan .................. 191/45 R |
| 53-27905 | 3/1978 | Japan ..................... 191/49 |
| 0120106 | 9/1979 | Japan .................. 191/33 R |
| 0152627 | 11/1980 | Japan ................ 191/22 DM |
| 0154336 | 11/1981 | Japan ................ 191/22 DM |
| 0217806 | 9/1987 | Japan ..................... 191/49 |

Primary Examiner—David A. Bucci
Assistant Examiner—Scott L. Lowe
Attorney, Agent, or Firm—Toren, McGeady & Associates

[57] ABSTRACT

A contact line for the transmission of data and/or energy for conveyors and robots, or the like, with a pickup that incorporates a wiper head that is connected to the conveyor. The contact line comprises an electrically conductive plastic. As a result, the transmission of data and/or energy is enhanced and made less costly.

8 Claims, 1 Drawing Sheet

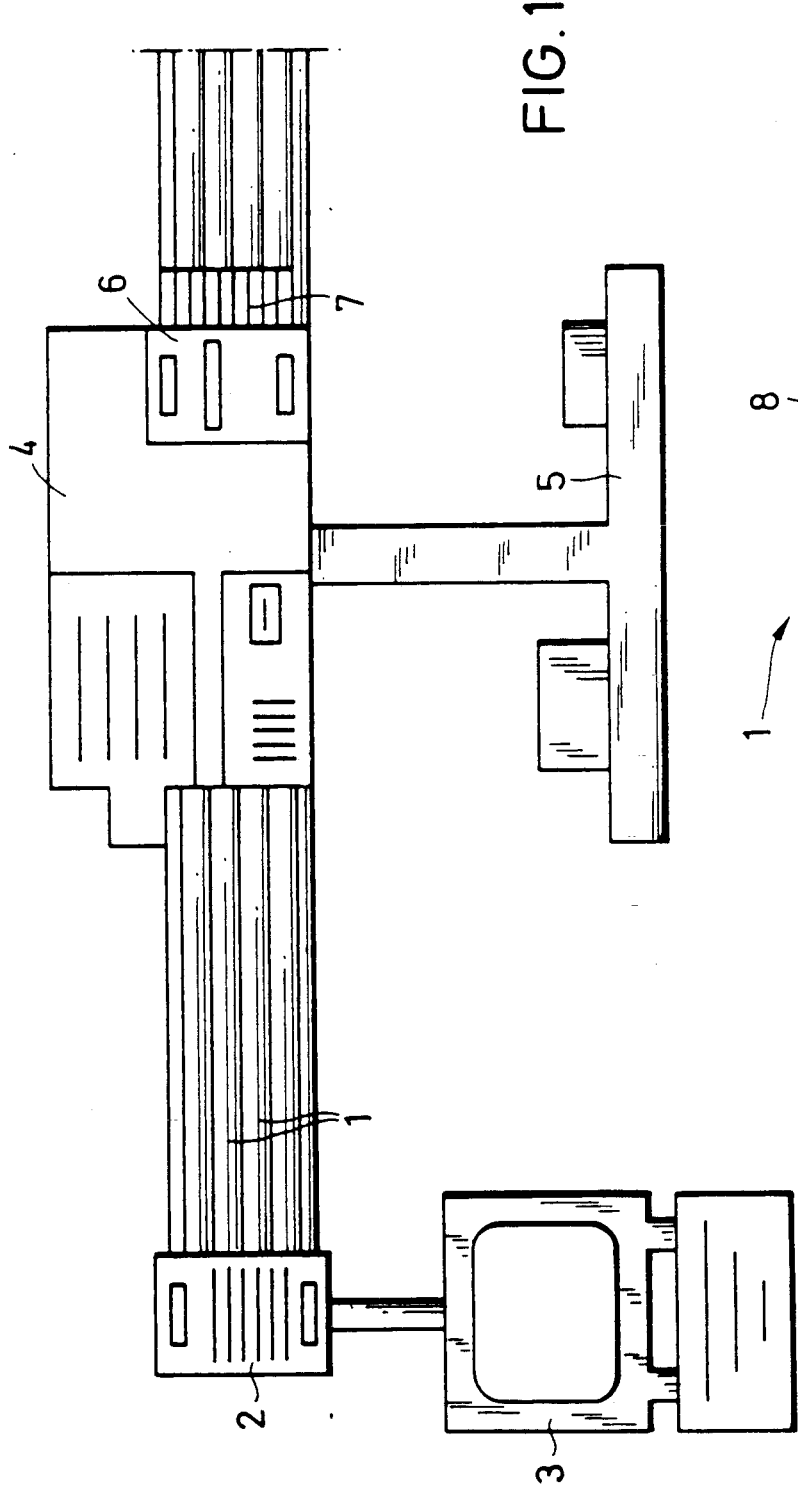
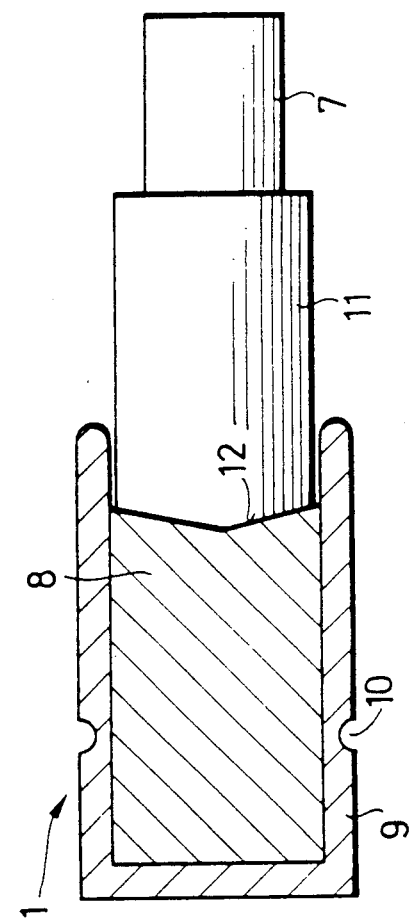
FIG.1
FIG. 2

PLASTIC CONTRACTING SYSTEM FOR TRANSMISSION TO VEHICLES

BACKGROUND OF THE INVENTION

The present invention relates to a contact line for the transmission of data and/or energy for conveyors, robots, or the like, with a pickup that incorporates a contact head, which is connected to the conveyor, and a process for the production of the contact line.

Such contact lines are used, in particular, in conveyor technology, as a rule for transmitting energy, but also data, for rail-type conveyors. These contact lines consist of parallel conductors that are swept by contact wipers. Both the wiper contacts and the lines are usually produced from copper or steel.

Disadvantageous in such contact lines is the relatively high cost of the materials that are involved, the high specific weight, and the resulting high installation costs. In addition, under certain conditions, contact lines of this kind are vulnerable to corrosion, and contact lines made from valuable and particularly costly stainless steel have to be used in such cases. A further particular disadvantages of these metal contact lines is the fact that as a result of production factors, a contact line has to be produced from a plurality of individual parts, the contact points between which frequency leading to breakdowns during operation.

It is known that the transmission of data to a receiver can be effected by means of infrared (IR) transmitters. Such IR transmitters cannot be used to transmit energy, but only for transmitting data. In addition, such IR transmitters are very costly, are prone to breakdown, and are particularly cost-intensive when used as additional or supplementary systems.

SUMMARY OF THE INVENTION

It is an object of the present invention to create a solution in which data and/or energy transmission for conveyor systems, robots or the like can be enhanced and made less costly.

According to the present invention there is provided a contact line for the transmission of data and/or energy for conveyor systems, robots, or the like, with a pick-up with a wiper head that is connected to the conveyer, wherein the contact line is made of electrically conductive plastic.

Compared to conventional copper or steel rails, a contact line of plastic is far more cost-effective and safer, and has a much lower specific weight, In addition, such a plastic line is much easier to maintain. A further advantage of a plastic contact line lies in the fact that one can either produce lines of infinite length and which thus incorporates no connection points, or one can produce a contact line from a plurality of individual elements, the connection points being joined together without any seams by welding. In addition, plastic contact lines are not vulnerable to corrosion, and can be encased simultaneously with plastic insulation in one production stage (e.g., by coextrusion).

In a preferred embodiment of the present invention, the line can be surrounded on a number of sides by a coextruded plastic sheathing. By this means it is possible to produce an insulation layer of nonconductive plastic in one production stage, and to do so in a very simple manner.

The present invention provides for the fact that the wiper head of the pickup is of non-metallic, electrically conductive material. Compared to conventional, metal wiper heads, a wiper head of this kind does not cause any wear on the plastic contact line, so that the function of said contact line is not impaired.

In a preferred embodiment of the present invention, the wiper head can be a carbon-brush system. However, it can also be desirable to make the wiper head of electrically conductive plastic. Both embodiments have been found useful since, on the one hand, no wear can be observed on the contact line, and on the other hand there is good transmission from the line to the pickup.

In order to solve the task that has been undertaken, the present invention also describes a process for the production of a contact line, in which a copolymer with a high filling of carbon black is extruded, under a slight shearing load with a long dwell in the exit nozzle of an extruder, to form a line, and is withdrawn from the extruder at a low withdrawal speed of 10 to 15 mm/s.

This production process provides an increased component thickness, whereby the cooling period is extended and relaxation is increased. This leads to a clear increase in electrical conductivity in the longitudinal direction of the profile. In addition, the profile produced in this manner displays a high degree of linearity of the conductivity in the direction of the longitudinal axis.

It is particularly expedient if a plastic sheath that surrounds the conductor on several side is coextruded as an insulating layer, in which case, of course, this coating is not conductive.

In order to increase the contact area between the contact line and the wiper head, the wiper head and line can be suitably profiled.

Advantageously, the present invention provides for the use of a contact line of this kind to position and/or determine the position of the pickup. Because of the electrical properties, and of the linear increase in resistance along the length of the conductive plastic contact line, it is possible to determine the position of the data user on the basis of the position of the data transmission buses in a particularly simple manner, without using any additional systems. On the other hand, the data user can be positioned just as simply.

SUMMARY OF DRAWINGS

The invention will now be described in more detail, by way of example only, with reference to the accompanying drawings in which:

FIG. 1 is a simplified diagram showing a contact line in use; and

FIG. 2 is a cross-section through a plastic contact line, with a pickup.

DETAILED DESSCRIPTION OF PREFERRED EMBODIMENTS

A contact line for transmitting data and/or energy incorporates a plurality of contact lines of 1 of electrically conductive plastic. These contact lines are connected through a stationary transmission device 2 (a transceiver) to a process-control computer 3 and a power supply. A data and energy receiver 4 is arranged so as to be able to move along the contact lines 1, and this incorporates running gear 5 and a mobile transmission device (transceiver) 6.

The transceiver 6 comprises a pick-up 7, which is in contact with the contact lines 1.

As is shown in greater detail in FIG. 2, an individual contact line 1 comprises an inner, conductive element 8 and an outer, preferably coextruded, plastic casing 9 as an insulating layer. Attachment grooves 10 or the like can be incorporates in this outer plastic casing 9, in order to simplify installation of a contact line of this kind. The pickup 7 has a wiper head 11 that is also of conductive material. This wiper head 11 makes the contact to the contact line 1 and the pick-up 7. The contact surface can be increased by a suitable profiling 12 of the contact line 1 and of the wiper head 11. Of course, other configurations of the wiper head are possible, e.g., it can be configured as a carbon-brush system.

The receiver 4 can be moved along the contact line 1 as desired. When this is done, because of the electrical properties of the extruded plastic contact lines 1, the linear increase of resistance in the longitudinal dimension makes it possible to determine the position of the receiver 4 at any time and very simply, without using any additional systems. At the same time, the receiver 4 can be positioned very preceisely by the process-control computer 3.

Naturally, the invention is not restricted to the embodiment shown herein. Other configurations of the present invention are possible without departing from its basic concept. Thus, for example, the configuration of the contact line and of the pickup can be selected so as to be different from that which si shown, etc.

We claim:

1. A contact line for conveying electrical data or energy over a distance, comprising:
   (a) an elongated contact member having a length much greater than its width and having an exposed contact surface extending along its length direction for receiving a sliding member, said contact member at least at the contact surface being constituted of an elecrrically conductive plastic material made of an extruded copolymer, highly filled with carbon black.

2. A contact line for conveying electrical data or energy over a distance comprising:
   (a) an elongated contact member having a length much greater than its width and having an exposed contact surface extending in its length direction along its entire length for receiving a sliding member, said contact member being constituted of an electrically conductive plastic material made of an extruded copolymer, highly filled with carbon black;
   (b) an electrically insulating material enclosing all surfaces of the contact member except for its contact surface.

3. A contact line system for conveying electrical data or energy from a distance to a sliding collector, comprising:
   (a) an elongated contact member having a length much greater than its width and having an exposed contact surface extending along its length direction for receiving a sliding member, said contact member at least the contact surface being constituted of an electrically conductive plastic material made of an extruded copolymer, highly filled with carbon black;
   (b) a collector member in sliding electrical contact engagement with the contact surface of the contact member.

4. The system of claim 3, wherein the contact member has a linear electrical resistance along its length direction, and means for using that linear electrical resistance to position or determine the position of the collector member relative to the length of the member.

5. A contact line system as claimed in claim 3, wherein the contact member is enclosed on several sides by a co-extruded plastic casing.

6. A contact line system as claimed in claim 3 wherein the collector is made of a non-metallic, electrically conductive material.

7. A contact line system as claimed in claim 6, wherein the collector comprises a carbon-brush system.

8. A contact line system as claimed in claim 6, wherein the collector is made of an electrically conductive plastic.

* * * * *